United States Patent
Pruetz et al.

(10) Patent No.: US 9,915,531 B2
(45) Date of Patent: Mar. 13, 2018

(54) ROTATION RATE SENSOR AND METHOD FOR OPERATING A ROTATION RATE SENSOR

(71) Applicant: Robert Bosch GmbH, Stuttgart (DE)

(72) Inventors: Odd-Axel Pruetz, Nuertingen (DE); Stefan Zehringer, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 133 days.

(21) Appl. No.: 15/008,732

(22) Filed: Jan. 28, 2016

(65) Prior Publication Data
US 2016/0223330 A1 Aug. 4, 2016

(30) Foreign Application Priority Data
Jan. 29, 2015 (DE) .................... 10 2015 201 544

(51) Int. Cl.
*G01C 19/574* (2012.01)

(52) U.S. Cl.
CPC .................. *G01C 19/574* (2013.01)

(58) Field of Classification Search
CPC ..................................... G01C 19/574
USPC ........................................ 73/504.12
See application file for complete search history.

(56) References Cited

U.S. PATENT DOCUMENTS

| 7,213,458 B2 * | 5/2007 | Weber | G01C 19/5719 73/504.12 |
| 8,375,786 B2 * | 2/2013 | Neul | G01C 19/5762 73/504.12 |
| 8,408,059 B2 * | 4/2013 | Pruetz | G01C 19/574 73/504.04 |

* cited by examiner

*Primary Examiner* — John Chapman, Jr.
(74) *Attorney, Agent, or Firm* — Norton Rose Fulbright US LLP; Gerard Messina

(57) ABSTRACT

A rotation rate sensor includes a substrate having a main extension plane and a Coriolis element, in which the rotation rate sensor is configured so that the Coriolis element is excitable with the aid of an excitation arrangement to carry out an excitation oscillation along a first direction and in parallel to the main extension plane, the rotation rate sensor including a compensation element for exerting a compensation force, the compensation force having a non-linear dependence on the excitation oscillation.

8 Claims, 4 Drawing Sheets

ROTATION RATE SENSOR AND METHOD FOR OPERATING A ROTATION RATE SENSOR

RELATED APPLICATION INFORMATION

The present application claims priority to and the benefit of German patent application no. 10 2015 201 544.0, which was filed in Germany on Jan. 29, 2015, the disclosure of which is incorporated herein by reference.

FIELD OF THE INVENTION

The present invention is directed to a rotation rate sensor.

BACKGROUND INFORMATION

Such rotation rate sensors are believed to be generally understood. Such rotation rate sensors include a substrate having a main extension plane and at least one Coriolis element, the Coriolis element being excitable with the aid of an excitation arrangement to carry out an excitation oscillation along an excitation direction which extends along a first direction in parallel to the main extension plane, whereby the Coriolis element experiences a deflection in the excitation direction. In the case of a rotational movement, a detection signal is detected as a function of a force action on the Coriolis element which is to be detected, for example in the form of a further deflection of the Coriolis element along a second direction perpendicular to the first direction. Due to production-related imperfections in the sensor composition, the excitation oscillation of the Coriolis element may have oscillation components along the second direction. This undesired force action is referred to hereafter as quadrature force. When the force action of the quadrature force has the same frequency as the excitation oscillation, it is referred to as 1 f quadrature force. Beyond that a 2 f quadrature force exists, whose force action has twice the frequency of the excitation oscillation. Compensation structures for compensating a 1 f quadrature force are already known. Furthermore, structures for compensating the 2 f quadrature force which have a linear dependence of the compensation force on the deflection in the excitation direction are known. However, structures for compensating the 2 f quadrature force which have a non-linear dependence of the compensation force on the excitation oscillation are not known yet.

SUMMARY OF THE INVENTION

The rotation rate sensor according to the present invention and the method according to the present invention for operating a rotation rate sensor according to the other independent claims have the advantage over the related art that a 2 f quadrature force which has a non-linear dependence on the deflection in the excitation direction is compensatable and/or that the modulation of the rotation rate sensor is optimally adaptable by the deliberate generation of a noisy signal. It is thus advantageously made possible to compensate a non-linear dependence of the 2 f quadrature force and thereby further improve the signal quality. The deliberate generation of a noisy signal in particular makes it possible to set a sufficiently large modulation of an A/D converter in an application-specific integrated circuit, which is used to evaluate the detection signal. This is achieved in that, contrary to the related art, the rotation rate sensor according to the present invention includes a compensation element for exerting the compensation force, the compensation force having a non-linear dependence on the deflection in the excitation direction. The rotation rate sensor according to the present invention includes at least one Coriolis element, i.e., both exemplary embodiments or refinements including one Coriolis element and such including multiple Coriolis elements are possible, in particular such including two Coriolis elements.

Advantageous embodiments and refinements of the present invention may be derived from the further descriptions herein as well as from the description with reference to the drawings.

According to one refinement, it is provided that, in the case of a rotational movement, the detection signal is detected as a function of a force action on the Coriolis element which is to be detected. The force action on the Coriolis element which is to be detected, for example in the form of a further deflection of the Coriolis element along a second direction perpendicular to a first direction, advantageously allows a rotation rate to be measured.

According to one refinement, it is provided that the compensation element is formed of a fixed electrode and a recess of the Coriolis element, the fixed electrode being connected to the substrate and situated in parallel to the main extension plane in the recess. In this way, it is advantageously made possible that a compensation oscillation component is excitable by applying an appropriate potential difference between the fixed electrode and the Coriolis element.

According to one refinement, it is provided that the compensation element excites the compensation oscillation component, the compensation oscillation component having a frequency which is essentially twice as large as the frequency of the excitation oscillation. In this way, it is advantageously made possible to compensate a 2 f quadrature force and/or to optimally adapt the modulation of the rotation rate sensor by the deliberate generation of a noisy signal.

According to one refinement, it is provided that the compensation element has a plane of mirror symmetry which extends along the second direction and a third direction extending perpendicularly to the main extension plane and centrally through the recess. In this way, it is advantageously made possible that a compensation oscillation component having a frequency which is essentially twice as large as the frequency of the excitation oscillation is excitable.

According to one refinement, it is provided that the rotation rate sensor includes a further Coriolis element which is essentially constructed identically to the Coriolis element and which is coupled to the Coriolis element via a spring element, the further Coriolis element being excitable with the aid of a further excitation arrangement to carry out a further excitation oscillation antiparallel to the excitation oscillation, the rotation rate sensor including a further compensation element for exciting a further compensation oscillation component, the further compensation element in particular including a further fixed electrode which is connected to the substrate and which is situated in parallel to the main extension plane in a further recess of the further Coriolis element. Advantageously, a differential rotation rate sensor is thus provided, which allows a differential and thus more precise evaluation of the rotation rate.

According to one refinement, it is provided that the compensation element and the further compensation element may be situated mirror-symmetrically to each other with respect to a plane which extends along the first direction and the third direction and centrally between the Coriolis element and the further Coriolis element. In this way, it is advantageously made possible that the further compensation element may be used to excite a further compensation oscillation component which is antiparallel to the compensation oscillation component excited by the compensation element.

Another object of the present invention is a method for operating a rotation rate sensor, the rotation rate sensor including at least one Coriolis element, one excitation arrangement and one compensation element, the Coriolis element being excited with the aid of the excitation arrangement to carry out an excitation oscillation along an excitation direction along a first direction and in parallel to the main extension plane, which results in a deflection of the Coriolis element in the excitation direction, a compensation force being exerted with the aid of the compensation element, the compensation force having a non-linear dependence on the deflection in the excitation direction. In this way, it is advantageously made possible that a 2 f quadrature force which has a non-linear dependence on the deflection in the excitation direction is compensatable and/or that the modulation of the rotation rate sensor is optimally adaptable by the deliberate generation of a noisy signal.

Identical parts are always denoted by the same reference numerals in the various figures and are therefore generally also cited or mentioned only once.

DETAILED DESCRIPTION

Figure 1:
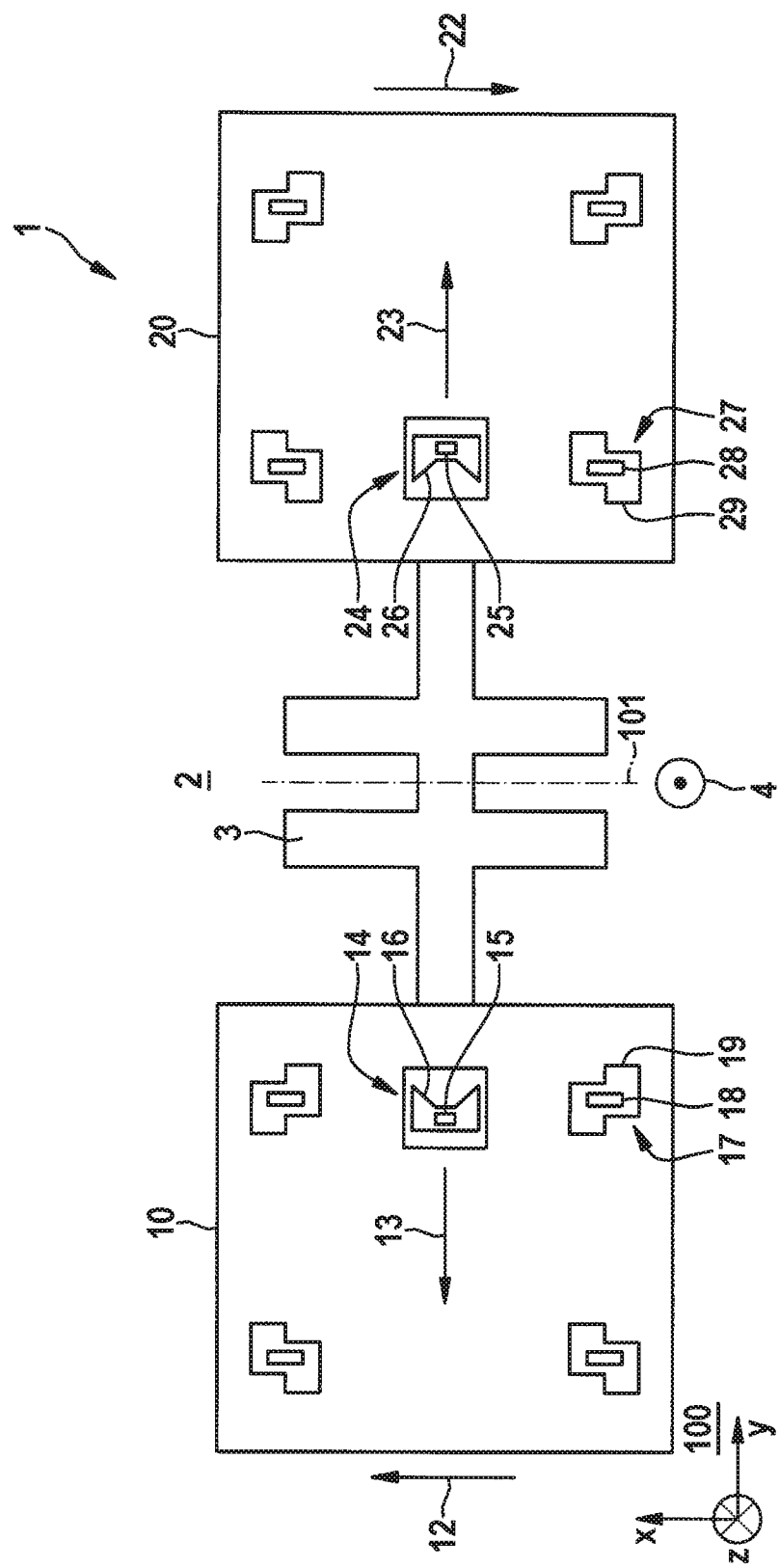
FIG. 1 schematically shows a top view onto a rotation rate sensor according to one exemplary specific embodiment of the present invention.

FIG. 1 schematically shows a top view onto a rotation rate sensor 1 according to one exemplary specific embodiment of the present invention. Rotation rate sensor 1 includes a substrate 2 having a main extension plane 100, a Coriolis element 10, and a further Coriolis element 20. Coriolis element 10 is coupled via a spring element 3 to further Coriolis element 20. Moreover, Coriolis element 10 is excitable with the aid of an excitation arrangement, which is not shown, to carry out an excitation oscillation 12 along an excitation direction which extends along a first direction X in parallel to main extension plane 100. As a result, Coriolis element 10 experiences a deflection 33 in the excitation direction, as shown on the right side of FIG. 2. Further Coriolis element 20 is excitable with the aid of a further excitation arrangement, which is not shown, to carry out a further excitation oscillation 22 antiparallel to excitation oscillation 12.

In the case of a rotation rate 4 about a rotational axis which is in parallel to a third direction Z, third direction Z extending perpendicularly to main extension plane 100, a detection signal is detected as a function of a force action on Coriolis element 10 which is to be detected, for example in the form of a further deflection 13 of Coriolis element 10 along a second direction Y perpendicular to first direction X. Analogously, further Coriolis element 20 experiences a third deflection 23 which is in parallel to second direction Y and antiparallel to further deflection 13. Further deflection 13 and third deflection 23 are detectable with the aid of detection arrangement which are not shown, the difference of the corresponding detection signals being a measure of the rotation rate.

Figure 2:
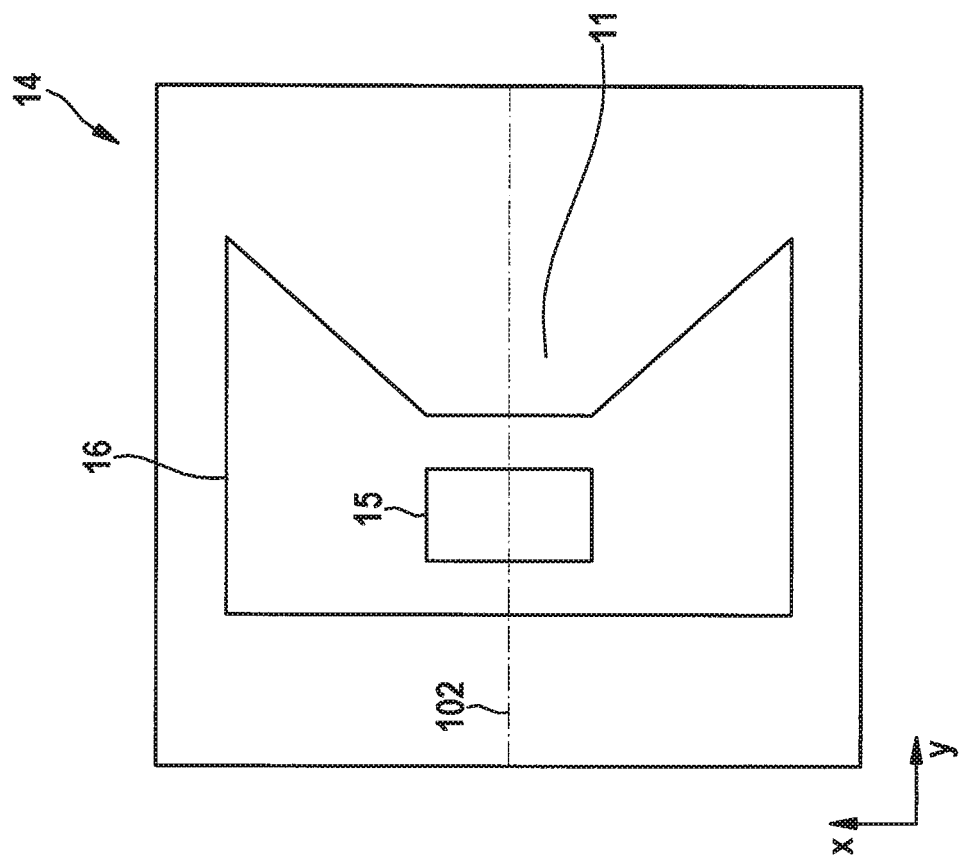
FIG. 2 on the left side schematically shows a top view onto a compensation element, and on the right side schematically shows a progression of the compensation force as a function of the deflection (in the drive direction) in a rotation rate sensor according to one exemplary specific embodiment of the present invention.

Rotation rate sensor 1 includes a compensation element 14 for exerting a compensation force 30, compensation force 30 having a non-linear dependence on deflection 33 in the excitation direction, as shown on the right side of FIG. 2. Compensation element 14 is formed of a fixed electrode 15 and a recess 16 of Coriolis element 10, fixed electrode 15 being connected to substrate 2 and situated in parallel to main extension plane 100 in recess 16 and having an elongated configuration along first direction X relative to second direction Y. A compensation oscillation component is excitable by applying a DC voltage between fixed electrode 15 and Coriolis element 10. Compensation element 14 has a plane of mirror symmetry, which extends along second direction Y and a third direction Z and centrally through recess 16, whereby the compensation oscillation component having a frequency which is essentially twice as large as the frequency of excitation oscillation 12 is excitable. The compensation oscillation component may be arbitrarily adapted by the selection of the DC voltage.

Analogously, rotation rate sensor 1 includes a further compensation element 24 for exciting a further compensation oscillation component, further compensation element 24 in particular including a further fixed electrode 25 which is connected to substrate 2 and situated in parallel to main extension plane 100 in a further recess 26 of further Coriolis element 20. Compensation element 14 is configured laterally reversed with respect to further compensation element 24 relative to a plane of symmetry 101 extending centrally along first direction X and third direction Z through rotation rate sensor 1.

The left side of FIG. 2 and FIGS. 3a, 3b, 3c, 4a and 4b schematically show partial views of rotation rate sensors 1, which merely illustrate compensation element 14 in enlarged form. In FIGS. 3a, 3b, 3c, 4b and on the left side of FIG. 2, recess 16 is configured in such a way that a protrusion 11 of Coriolis element 10 is created, which extends along second direction Y in the direction of fixed electrode 15 and is situated along first direction X centrally relative to recess 16. Furthermore, fixed electrode 15 has a cuboid configuration on the left side of FIG. 2, and in FIGS. 3a, 3b, 3c and 4a.

On the left side of FIG. 2, protrusion 11 of Coriolis element 10 has slanted flanks. The right side of FIG. 2 schematically shows the progression of compensation force 30 of rotation rate sensor 1, which includes compensation element 14 shown on the left side of FIG. 2. Compensation force 30 is plotted on y axis 31, and deflection 33 in the excitation direction of Coriolis element 10 is plotted on x axis 32. Compensation force 30 has a non-linear dependence on deflection 33 in the excitation direction, in particular as a function of the fourth order of deflection 33 in the excitation direction.

Figure 3A:
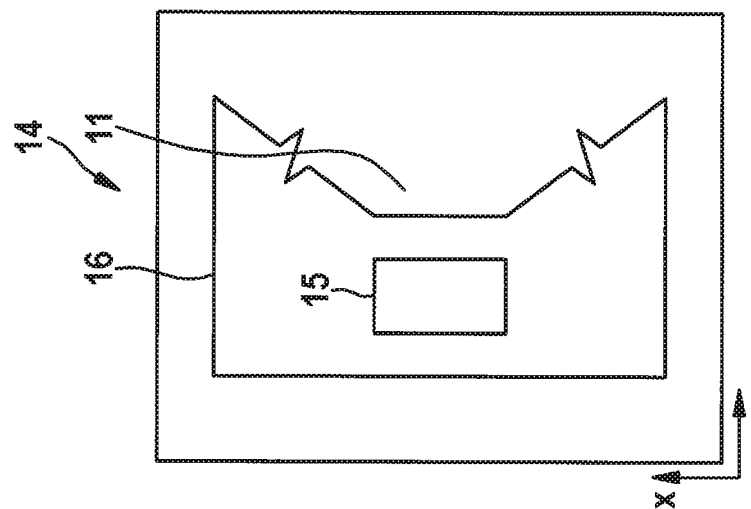
FIGS. 3a, 3b and 3c schematically show a top view onto compensation elements according to further exemplary specific embodiments of the present invention.
Figure 3B:
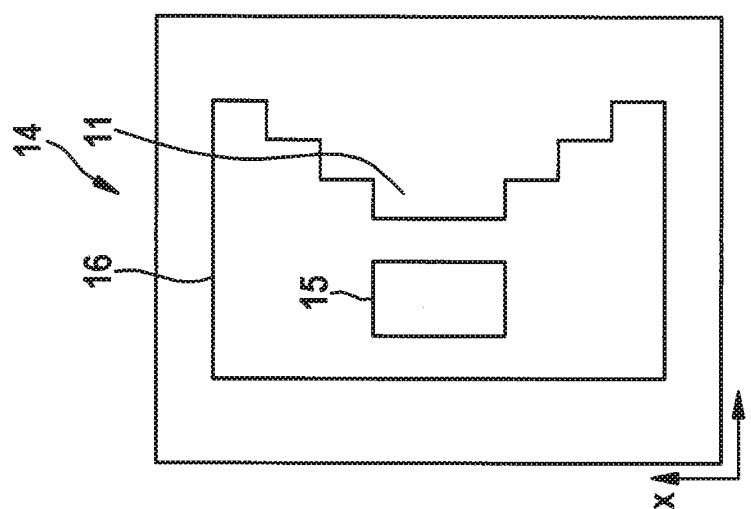

Further non-linear dependencies of compensation force 30 on deflection 33 in the excitation direction may be achieved by different shapes of recess 16 and, associated therewith, of protrusion 11. In FIG. 3a, protrusion 11 of Coriolis element 10 has curved flanks. In FIG. 3b, protrusion 11 of Coriolis element 10 has stepped flanks.

Figure 3C:
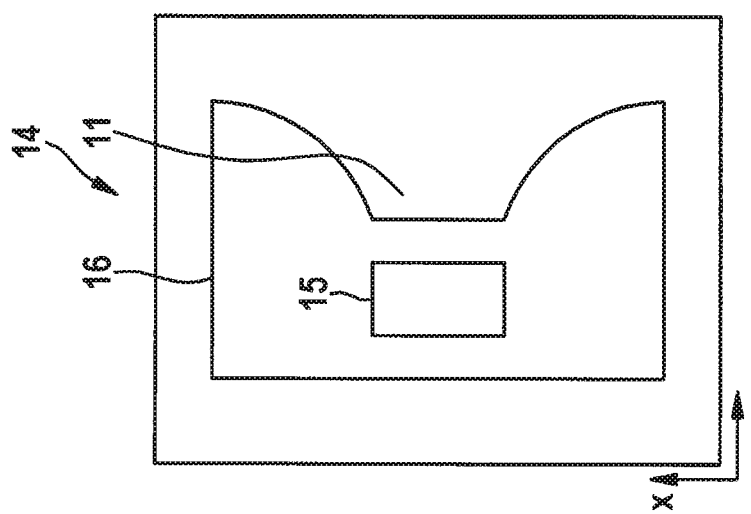

In FIG. 3c, protrusion 11 of Coriolis element 10 has slanted flanks, the flanks having a non-rectilinear progression. The non-rectilinear progression is achieved by additionally inserted tips, corners and/or teeth, for example. Due to the non-rectilinear progression, a noisy signal is deliberately generated. The noisy signal is to ensure that an A/D converter, which is an integral part of an application-specific integrated circuit for the evaluation of the detection signal, has sufficient modulation. According to this specific embodiment, compensation element 14 is used to exert a disturbance force, whereby a noisy signal is deliberately generated. Compensation element 14 may thus also be referred to as disturbance element 14, and the compensation oscillation component may also be referred to as the disturbance oscillation component.

Figure 4B:
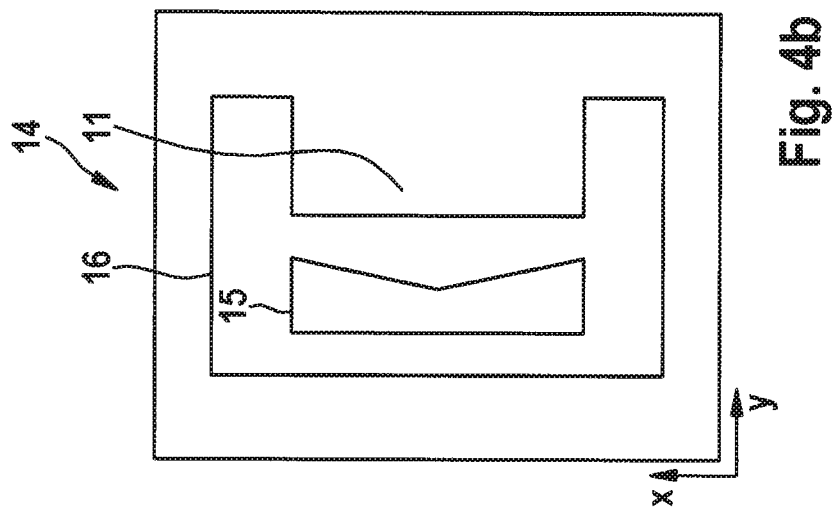
FIGS. 4a and 4b schematically show a top view onto compensation elements according to further exemplary specific embodiments of the present invention.
Figure 4A:
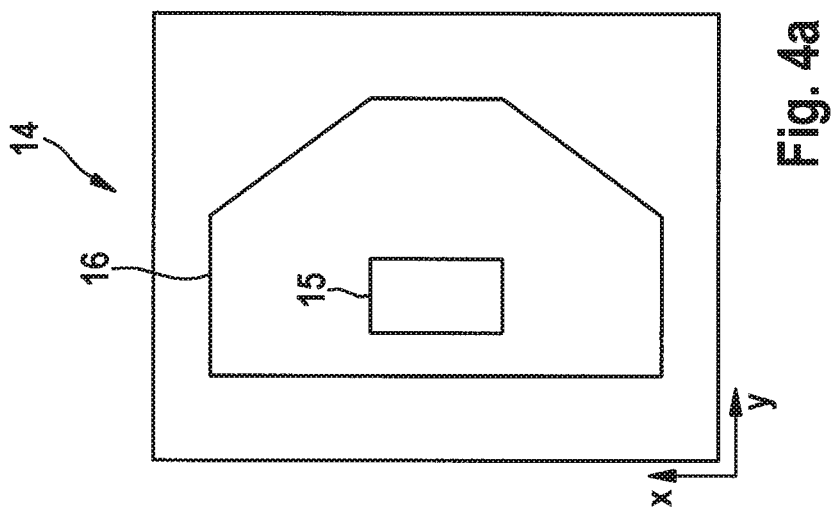

Compensation elements 14 shown in FIGS. 4a and 4b have a force action which is antiparallel to the force action of compensation elements 14 shown in FIGS. 3a, 3b, 3c and on the left side of FIG. 2. Recess 16 of compensation element 14 shown in FIG. 4a has slanted flanks on the right side. Recess 16 of compensation element 14 shown in FIG. 4b has a C-shaped configuration, and fixed electrode 15 has a recess tapering in second direction Y and extending in first direction X across the entire expansion of fixed electrode 15.

According to one further specific embodiment, rotation rate sensor 1 includes four 1 f compensation elements 17 and four further 1 f compensation elements 27, 1 f compensation elements 17 each having a 1 f compensation recess 19 in Coriolis element 10 and a 1 f compensation electrode 18 which is fixedly connected to substrate 2 and engages in 1 f compensation recess 19 along third direction Z. 1 f compensation recesses 19 each have an S-shaped (alternatively, an L-shaped) configuration. Further 1 f compensation elements 27 are composed analogously in the area of further Coriolis element 20. 1 f compensation elements 17 and further 1 f compensation elements 27 are provided to suppress the 1 f quadrature force, and thereby improve the signal quality.

What is claimed is:

1. A rotation rate sensor, comprising:
   a substrate having a main extension plane;
   a Coriolis element excitable by an excitation arrangement to carry out an excitation oscillation along an excitation direction along a first direction and in parallel to the main extension plane, which results in a deflection of the Coriolis element in the excitation direction; and
   a compensation element for exerting a compensation force, which has a non-linear dependence on the deflection in the excitation direction,
   wherein the compensation element is configured to exert a disturbance force whereby a noisy signal is deliberately generated.

2. The rotation rate sensor of claim 1, wherein, in the case of a rotational movement, a detection signal is detected via a detection arrangement as a function of a force action on the Coriolis element which is to be detected.

3. The rotation rate sensor of claim 1, wherein the compensation element includes a fixed electrode and a recess of the Coriolis element, the fixed electrode being connected to the substrate and situated in parallel to the main extension plane in the recess.

4. The rotation rate sensor of claim 3, wherein the compensation element has a plane of mirror symmetry which extends along a second direction and a third direction extending perpendicularly to the main extension plane and centrally through the recess.

5. The rotation rate sensor of claim 1, wherein the compensation element excites a compensation oscillation component, the compensation oscillation component having a frequency which is essentially twice as large as the frequency of the excitation oscillation.

6. The rotation rate sensor of claim 1, further comprising:
   a further Coriolis element which is essentially constructed identically to the Coriolis element and which is coupled to the Coriolis element via a spring element, the further Coriolis element being excitable by a further excitation arrangement to carry out a further excitation oscillation antiparallel to the excitation oscillation; and
   a further compensation element for exciting a further compensation oscillation component, the further compensation element including a further fixed electrode which is connected to the substrate and which is situated in parallel to the main extension plane in a further recess of the further Coriolis element.

7. The rotation rate sensor of claim 6, wherein the compensation element and the further compensation element are situated mirror-symmetrically to each other relative to a plane which extends along the first direction and a third direction and centrally between the Coriolis element and the further Coriolis element.

8. A method for operating a rotation rate sensor, the method comprising:
   exciting a Coriolis element of the rotation rate sensor by an excitation arrangement of the rotation rate sensor to carry out an excitation oscillation along an excitation direction along a first direction and in parallel to the main extension plane, which results in a deflection of the Coriolis element in the excitation direction, a compensation force being exerted with the aid of a compensation element of the rotation rate sensor, wherein the compensation force has a non-linear dependence on the deflection in the excitation direction, wherein the compensation element is configured to exert a disturbance force whereby a noisy signal is deliberately generated.

\* \* \* \* \*